United States Patent
Ashcraft et al.

(10) Patent No.: US 10,343,552 B2
(45) Date of Patent: Jul. 9, 2019

(54) HETEROGENEOUS ELECTRICAL ENERGY STORAGE SYSTEM

(71) Applicant: Samsung Electronics Co., Ltd, Suwon-si (KR)

(72) Inventors: Robert Wilson Ashcraft, Arlington, MA (US); Masoud Aryanpour, Malden, MA (US); Lincoln James Miara, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/428,018

(22) Filed: Feb. 8, 2017

(65) Prior Publication Data

US 2018/0226823 A1 Aug. 9, 2018

(51) Int. Cl.
*B60L 58/20* (2019.01)
*H02J 7/14* (2006.01)
(Continued)

(52) U.S. Cl.
CPC .............. *B60L 58/20* (2019.02); *B60L 58/12* (2019.02); *B60L 58/14* (2019.02); *B60L 58/16* (2019.02);
(Continued)

(58) Field of Classification Search
CPC .............. B60L 11/1859; B60L 11/1861; B60L 11/1866; B60L 3/0046; H02J 7/0054;
(Continued)

(56) References Cited

U.S. PATENT DOCUMENTS 7,737,660 B2 * 6/2010 Yun ....................... H02J 7/0004
320/132
8,222,865 B2 * 7/2012 Lim .................... H01M 10/441
320/124
(Continued)

FOREIGN PATENT DOCUMENTS

WO 2011087588 A2 7/2011
WO 2014189920 A1 11/2014
(Continued)

OTHER PUBLICATIONS

Nemeth, Thomas et al., "Operating Strategies for Modular Hybrid Battery Storage Systems in Electric Vehicles", Advanced Automotive & Industrial/Stationary Batter Conference, Jun. 15-19, 2015, Detroit, Michigan, 6 pages
(Continued)

*Primary Examiner* — Helen Rossoshek

(57) ABSTRACT

A heterogeneous electrical energy storage system (HESS) is managed by determining a power demand of a dynamic electrical power load in a system having multiple rechargeable energy storage components, each of the energy storage components having a respective capacity, energy delivery rate, energy density, specific energy, and cycle characteristic. In response to determining the power demand of the electrical power load, one or more of the energy storage components are discharged to supply power to the electrical power load in accordance with at least one of: a respective remaining capacity measured for at least some of the energy storage components, and the power demand of the electrical power load relative to one or more respective rate limits currently applied to the energy storage components.

20 Claims, 10 Drawing Sheets

(51) Int. Cl.
  *B60L 58/16* (2019.01)
  *B60L 58/14* (2019.01)
  *B60L 58/12* (2019.01)
  *H02J 7/00* (2006.01)

(52) U.S. Cl.
  CPC ....... *H02J 7/1423* (2013.01); *B60L 2240/545* (2013.01); *H02J 7/0021* (2013.01); *H02J 7/0054* (2013.01); *H02J 7/0063* (2013.01); *H02J 2007/0067* (2013.01); *Y02T 10/7005* (2013.01)

(58) Field of Classification Search
  CPC .................. H02J 7/0063; H02J 7/0021; H02J 2007/0067; H02J 7/1423
  See application file for complete search history.

(56) References Cited

U.S. PATENT DOCUMENTS

| | | | |
|---|---|---|---|
| 8,574,790 B2 | 11/2013 | Sinha et al. | |
| 8,586,238 B2 | 11/2013 | Chiang et al. | |
| 8,692,507 B2* | 4/2014 | Chen | B60L 11/1868 320/103 |
| 8,709,647 B2 | 4/2014 | Gozdz et al. | |
| 8,854,010 B2 | 10/2014 | Obata et al. | |
| 8,884,582 B2 | 11/2014 | DeFrank et al. | |
| 8,920,974 B2 | 12/2014 | Choi et al. | |
| 8,927,068 B2 | 1/2015 | Brown et al. | |
| 8,945,668 B2 | 2/2015 | Sim et al. | |
| 8,945,766 B2 | 2/2015 | Yoshida et al. | |
| 8,974,944 B2 | 3/2015 | Kim et al. | |
| 9,054,383 B2 | 6/2015 | Roev et al. | |
| 9,056,556 B1 | 6/2015 | Hyde et al. | |
| 9,166,419 B2 | 10/2015 | Girard et al. | |
| 9,748,765 B2* | 8/2017 | Huang | H02J 1/00 |
| 2005/0057220 A1* | 3/2005 | Miwa | H02J 7/0021 320/116 |
| 2005/0275372 A1 | 12/2005 | Crowell | |
| 2010/0035152 A1 | 2/2010 | Sastry et al. | |
| 2010/0283427 A1 | 11/2010 | Sugiyama et al. | |
| 2011/0142751 A1* | 6/2011 | Eickhoff | B01J 7/02 423/648.1 |
| 2011/0168550 A1 | 7/2011 | Wang et al. | |
| 2012/0231346 A1 | 9/2012 | Tsujii et al. | |
| 2012/0251896 A1 | 10/2012 | Chiang et al. | |
| 2012/0308851 A1* | 12/2012 | Akiyama | H01M 16/006 429/9 |
| 2013/0020998 A1 | 1/2013 | Howard | |
| 2013/0029234 A1 | 1/2013 | Roev et al. | |
| 2013/0141045 A1 | 6/2013 | Karim et al. | |
| 2013/0175972 A1* | 7/2013 | Akiyama | H01M 8/0494 320/101 |
| 2014/0015488 A1* | 1/2014 | Despesse | H01M 10/425 320/122 |
| 2014/0253045 A1 | 9/2014 | Poznar | |
| 2014/0266061 A1* | 9/2014 | Wachal | H02J 7/0068 320/134 |
| 2014/0285936 A1 | 9/2014 | Garbacik et al. | |
| 2014/0306519 A1 | 10/2014 | Song | |
| 2015/0140443 A1 | 5/2015 | Takahashi et al. | |
| 2015/0156766 A1* | 6/2015 | Xu | H04L 5/0032 370/252 |
| 2015/0207344 A1* | 7/2015 | Wang | B60K 6/28 180/65.21 |
| 2015/0280185 A1 | 10/2015 | Lampe-Onnerud et al. | |
| 2015/0295420 A1 | 10/2015 | Cheng et al. | |
| 2015/0352972 A1 | 12/2015 | Li | |
| 2016/0020623 A1* | 1/2016 | Tamburrino | H02J 7/0021 320/103 |
| 2016/0248266 A1* | 8/2016 | Ferrese | H02J 7/0003 |
| 2016/0254664 A1* | 9/2016 | Huang | H02J 1/00 307/52 |
| 2016/0380460 A1* | 12/2016 | Dominguez Amarillo | H02J 7/0063 307/74 |

FOREIGN PATENT DOCUMENTS

| | | |
|---|---|---|
| WO | 2015001751 A1 | 1/2015 |
| WO | 2015032950 A1 | 3/2015 |
| WO | 2015102998 A1 | 7/2015 |
| WO | 2015157456 A1 | 10/2015 |

OTHER PUBLICATIONS

Badam, Anirudh et al., "Software Defined Batteries", Symposium on Operating Systems Principles 2015, Oct. 4-7, 2015, Monterey, California, pp. 215-229.

* cited by examiner

HETEROGENEOUS ELECTRICAL ENERGY STORAGE SYSTEM

TECHNICAL FIELD

This disclosure relates generally to multi-chemistry battery systems. More specifically, this disclosure relates to systems and methods for managing charge and discharge behavior of heterogeneous electrical energy storage systems (HESS).

BACKGROUND

As electric vehicles (EVs) migrate towards mass-market adoption, the performance of battery packs and vehicles to better compete with internal combustion engines that are ubiquitous today has become more important. For EVs to be competitive with internal combustion engines, they will likely need some combination of increased driving range, decreased cost, increased battery longevity, increased performance (power), or faster charge times.

SUMMARY

This disclosure provides systems and methods for managing a heterogeneous electrical energy storage system.

In a first embodiment, a method for managing a heterogeneous electrical energy storage system (HESS) includes determining a power demand of a dynamic electrical power load in a system having multiple rechargeable energy storage components, each of the energy storage components having a respective capacity, energy delivery rate, energy density, specific energy, and cycle characteristic. The method further includes, in response to determining the power demand of the electrical power load, discharging one or more of the energy storage components to supply power to the electrical power load in accordance with at least one of: a respective remaining capacity measured for at least some of the energy storage components, the cycle life characteristics of at least some of the energy storage components, the historical condition or usage of at least some of the energy storage components, and the power demand of the electrical power load relative to one or more respective rate limits currently applied to the energy storage components.

In a second embodiment, a HESS includes multiple rechargeable energy storage components, wherein each of the energy storage components has a respective capacity, energy delivery rate, energy density, specific energy, and cycle characteristic. The HESS also includes a processor configured to measure a respective remaining capacity for at least some of the energy storage components. The processor is further configured to determine one or more respective rate limits currently applied to the energy storage components, determine a power demand of a dynamic electrical power load, and, in response to determining the power demand of the electrical power load, discharge one or more of the energy storage components to supply power to the electrical power load in accordance with at least one of: the respective remaining capacity for at least some of the energy storage components, the cycle life characteristics of at least some of the energy storage components, the historical condition or usage of at least some of the energy storage components, and the one or more respective rate limits currently applied to the energy storage components.

In a third embodiment, a non-transitory computer readable medium embodies a computer program, and the computer program includes computer readable program code that when executed causes at least one processing device to determine a power demand of a dynamic electrical power load in a system having multiple rechargeable energy storage components. Each of the energy storage components has a respective capacity, energy delivery rate, energy density, specific energy, and cycle characteristic. The computer readable program code further includes code that when executed causes the at least one processing device to, in response to determining the power demand of the electrical power load, discharge one or more of the energy storage components to supply power to the electrical power load in accordance with at least one of: a respective remaining capacity measured for at least some of the energy storage components, the cycle life characteristics of at least some of the energy storage components, the historical condition or usage of at least some of the energy storage components, and the power demand of the electrical power load relative to one or more respective rate limits currently applied to the energy storage components.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system.

The present disclosure relates to improved discharge management for a heterogeneous electrical energy storage system (HESS). A HESS, which may alternatively be referred to as a "multi-chemistry battery," combines two or more different types of energy storage components to optimize the function or cost of an energy storage system. Different types of energy storage components may include different energy storage mechanisms (e.g., battery, capacitor, etc.), different battery active materials (e.g., graphite, Li-metal anodes, etc.), different battery electrode structures using the same materials (e.g., more or less porosity), or the like. Each energy storage component has specific performance or cost attributes that are tailored to some aspects of a desired operational situation. For example, a HESS may comprise a combination of a battery and a supercapacitor, where the battery provides a large energy reservoir and the supercapacitor provides high power capability. The ratio of battery to supercapacitor in such a HESS may depend on requirements of an application and cost considerations.

A HESS may be designed to provide the capacity to satisfy large spikes in power demand, while also providing long cycle life (or other desirable cycle characteristics) for average, lower power demands. For example, when a HESS is implemented in an EV, the HESS may be designed to provide long cycle life for average driving distances, while still being able to provide spikes in power for periods of high acceleration or being able to provide energy for extended trips.

The HESS of the present disclosure combines multiple energy storage types in a single battery pack in a manner harnessing the benefits of each type while mitigating deficiencies when operating under complex and varying loads. The operating principles for the HESS of the present disclosure are based upon operating each energy storage type where they work best, using (for example), long cycle life cells first and most often, limiting discharge on "sensitive" cells to small depth, and augmenting available energy with high-power energy storage in order to satisfy high-rate bursts in demand.

Figure 1:
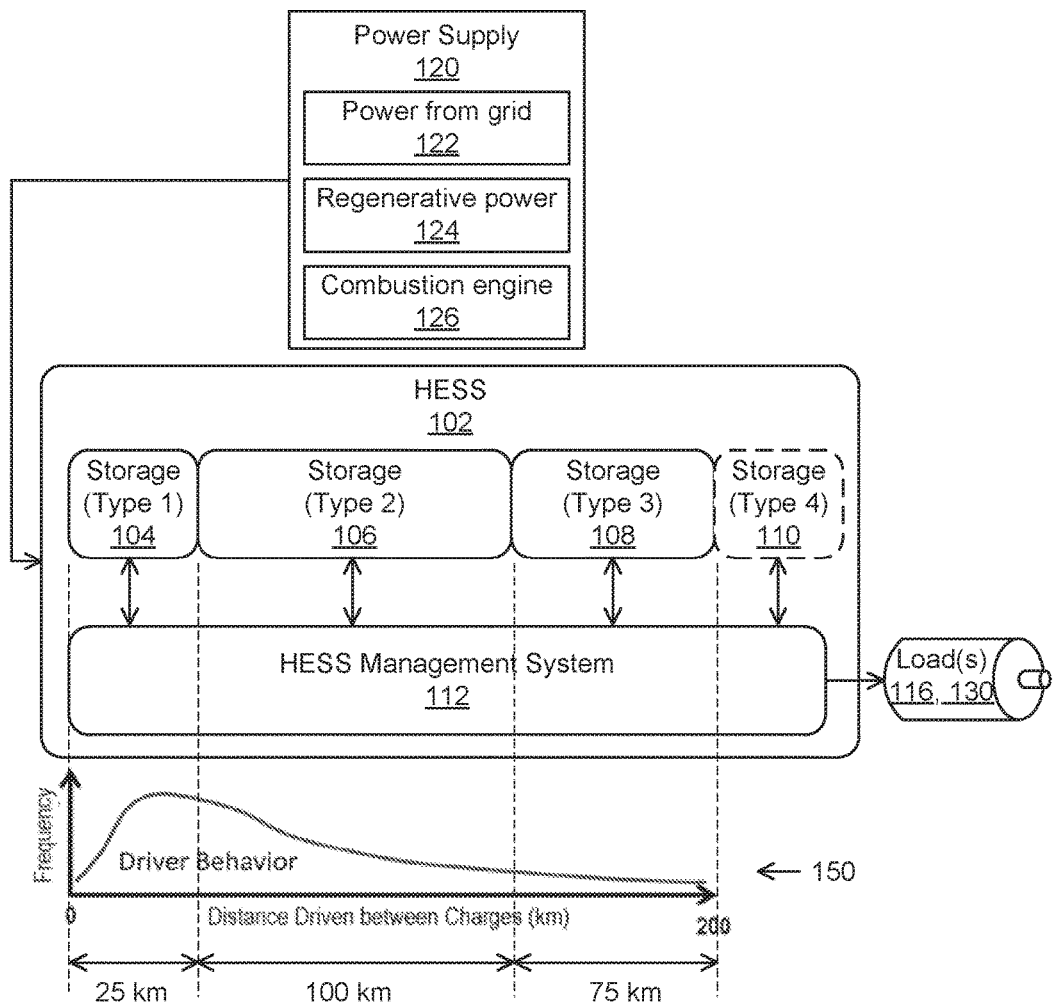
FIG. 1 is a diagrammatic illustration of an exemplary HESS in accordance with the present disclosure.

FIG. 1 is a diagrammatic illustration of an exemplary HESS in accordance with the present disclosure. In general, the HESS 102 includes electrical energy storage components 104, 106, 108, 110, . . . , etc. of different types. In the example depicted, electrical energy storage component 104 is a first type, electrical energy storage component 106 is a second type, and electrical energy storage component 108 is a third type. The HESS 102 may optionally also include electrical energy storage component 110 of a fourth type, as well as additional electrical energy storage component(s) of further type(s) (not shown). In one exemplary implementation, electrical energy storage component 104 may be formed by or include one or more medium energy, extra-long cycle life batteries, electrical energy storage component 106 may be may be formed by or include one or more general purpose lithium ion (Li-ion) batteries, and electrical energy storage component 108 may be formed by or include one or more ultra-high energy, low cycle life batteries. As used herein, "long cycle life" (or "extra-long cycle life") or "low cycle life" refers to the ability of the battery to sustain substantially full operation over a large or small number of charge-discharge cycles during which the battery is fully charge or substantially charged and then fully or substantially depleted before once again being charged. Each electrical energy storage components 104, 106, and 108 may be formed by a plurality of individual storage cells or devices connected and operated in conjunction with each other as, effectively, a single device.

In some embodiments, electrical energy storage component 110 may be formed by or include one or more high rate, low energy density batteries. In addition, the HESS 102 may optionally include temporary energy storage devices such as super- or ultra-capacitors or flywheel energy storage devices. The HESS 102 is normally discharged primarily by supplying electrical energy to load(s) 116, 130 (described in further detail below). The HESS 102 may be charged from various generation or recuperation power supply components 120, which may include a connection 122 to an electrical power grid (when such connection is available), regenerative power sources 124 (e.g., regenerative braking), and combustion power sources 126 (e.g., a combustion engine and/or generator).

The different energy storage components 104-110 may have different energy densities (i.e., amount of energy stored per volume of the storage component), different power densities (i.e., power capability per volume of the storage component), different cycle lives (i.e., different numbers of charge-discharge cycles before their capacity degrades by more than a certain amount), different peak power output rates, different charge times, and/or different production costs, among other features. There may be tradeoffs between, for example, energy density and peak power output rate in a given energy storage component. Accordingly, it is advantageous to have a range of energy storage components to handle different power demands of one or more load(s) 116, 130 (described in further detail below). For instance, an extra-long cycle life battery may be useful to handle the brunt of typical power demands, but may not produce enough power to handle high power loads, so a higher peak power output energy storage component may be useful to assist in handling occasional, intermittent or sporadic high power load demands. Additionally, an extra-long cycle life battery may not store enough energy to satisfy the load demand for occasional high-energy demands (e.g., longer driving trips), so a higher-energy-density energy storage component may be useful to ensure high-energy demands can be met.

The HESS 102 further includes a HESS management system 112 which manages charging and discharging of the energy storage components 104-110. Each energy storage component 104, 106, 108 (and 110 as well as other components not shown, for alternative embodiments) interfaces with the HESS management system 112. The HESS management system 112 coordinates interfacing the energy storage components 104, 106, and 108 with load(s) 116, 130, etc., such as an electric motor 116 or an auxiliary device 130, and with power supply 120. The HESS management system 112 may detect demand from the load(s) 116, 130, etc. and control delivery of electrical power from different ones of the energy storage components 104, 106 and 108 as described in further detail below. The HESS management system 112 may further detect supply from the power supply 120 and coordinate delivery of power to different ones of the energy storage components.

The composition of HESS 102, and specifically the type and capacity of each of the energy storage components within HESS 102, may be selected based in part on mass and/or volume for each respective energy storage component. Preferably, the composition of HESS 102 is selected based at least in part on the frequency of specific electrical energy demand from the HESS 102, such as the range distribution of typical usage of the electric vehicle. Graph 150 is an illustrative graph of behavior of a driver of an example EV. The x-axis of graph 150 represents distance driven between charges in kilometers (km) while the y-axis of graph 150 represents the frequency that a typical driver drives a corresponding distance between charges. In the example shown, the average driver mostly drives short distances, e.g., 20-50 km. This may be representative of a driver who mostly commutes to work, and occasionally takes a longer road trip. The width of the different types of energy storage components 104, 106 and 108 is diagrammatically depicted as aligning with the three ranges (0-25 km, 25-125 km, and 125-200 km) specified. That graphically depicts selection of capacity for the different types of energy storage components 104, 106 and 108 that would substantially meet the demand during use within the corresponding range.

By way of further explanation, the type and/or capacity of the energy storage components 104, 106, and 108 in a particular embodiment of the HESS 102 may be chosen based on an expected driving behavior such as that shown in graph 150. As illustrated in FIG. 1, the relative length of the energy storage components 104-110 in the x-axis direction (relative to graph 150) may illustrate their energy capacity in relation to graph 150, and HESS management system 112 coordinates when power is drawn from each energy storage component. For example, medium energy extra-long cycle life battery energy storage component 104 may have relatively small capacity, and contain enough energy to handle approximately 25 km worth of average driving. The HESS management system 112 may be designed to draw power from energy storage component 104 first, such that energy storage component 104 bears the full energy cost of very short trips (e.g., weekday commutes or weekend errands). Furthermore, the medium energy extra-long cycle life battery energy storage component 104 may be the first battery used even on longer trips, meaning that even for 30 or 35 km trips most of the energy cost (and accordingly most of the discharging and recharging wear) would be placed on energy storage component 104, since the very high life cycle is more suitable for such usage than the life cycles of the remaining energy storage components 106 and 108 in the example shown. The medium energy extra-long cycle life battery 104 may be designed to resist degradation over many charge and discharge cycles, making it best suited to be the first priority for repeated charging and discharging.

General purpose Li-ion battery energy storage component 106 may be chosen to provide energy for approximately 100 km worth of average driving, since it may have a somewhat lower cycle life but higher energy density or peak power output than the medium energy extra-long cycle life battery energy storage component 104. In the example of graph 150, the combination of medium energy extra-long cycle life battery 104 and general purpose Li-ion battery 106 can supply the needed energy and power for the large majority of use cases of the example EV (up to 125 km of range).

Ultra-high energy low cycle life battery energy storage component 108 may be included in the HESS 102 to extend the range of the EV out to 200 km and/or extend the power output capability of the EV. In some embodiments, additional power supply components such as supercapacitor 110 may be provided as a small, very high peak power output reserve to provide extra energy for any power output demanded by load(s) 116, 130 that exceeds the peak power output available from medium energy extra-long cycle life battery energy storage component 104, general purpose Li-ion battery energy storage component 106, and ultra-high energy low cycle life battery energy storage component 108 in combination. The HESS management system 112 may avoid discharging energy from ultra-high energy low cycle life battery energy storage component 108 as much as possible, since the relatively low cycle life of such storage makes the component prone to degradation from repeated charging and discharging. However, ultra-high energy low cycle life battery energy storage component 108 may be calibrated based on an average driver's behavior and the HESS management system 112's behavior to degrade no faster than either the medium energy extra-long cycle life battery energy storage component 104 or the general purpose Li-ion battery energy storage component 106 under typical or normal use cases.

Although FIG. 1 illustrates one example of a HESS 102 for an EV, various changes may be made to the structure of FIG. 1. For example, more or fewer energy storage components may be included in the HESS 102, the relative sizes and compositions of energy storage components may be different, or driver behavior may be different from that displayed in graph 150. As a specific example, the HESS 102 may contain only the three energy storage components depicted: a medium energy extra-long cycle life battery energy storage component 104, a general purpose Li-ion battery energy storage component 106, and ultra-high energy low cycle life battery energy storage component 108, but with a flywheel energy storage component in place of super capacitor as type 4 energy storage component 110. The medium energy extra-long cycle life battery energy storage component 104 and the general purpose Li-ion battery energy storage component 106 may each be designed to support up to 100 km of average driving, while the flywheel energy storage component may be available for temporary demand for high power output from load(s) 116, 130. In addition, those skilled in the art will recognize, for simplicity and clarity, that the full structure of a HESS and associated EV is not depicted in FIG. 1 (or FIGS. 2-3 described below) or described herein. Instead, only so much of the structure and operation of a HESS and EV as are unique to the present disclosure or necessary for an understanding of the present disclosure are depicted in the figures and described herein.

Figure 2:
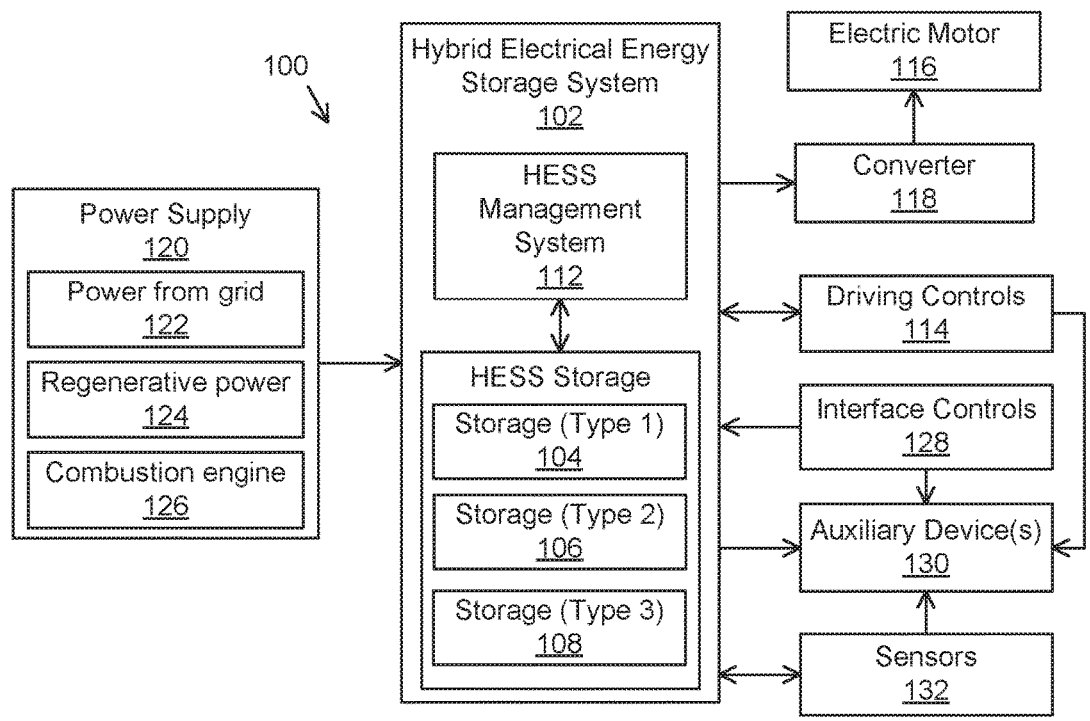
FIG. 2 is a block diagram of electronic components of an exemplary electric vehicle within which an HESS is implemented in accordance with the present disclosure.

FIG. 2 is a block diagram of electronic components of an exemplary electric vehicle within which an HESS is implemented in accordance with the present disclosure. The embodiment of the EV 100 shown in FIG. 2 is for illustration only. Other embodiments of the EV 100 could be used without departing from the scope of this disclosure. The EV 100 contains a HESS 102 and various electronic components powered by the HESS.

As shown in FIG. 2, the EV 100 includes the HESS 102, which contains two or more energy storage components as discussed above. It is understood that more or fewer energy storage components may be included in the HESS 102, and that the HESS 102 may include different types of energy storage components. The HESS 102 further contains the HESS management system 112 which manages power distribution to various electronic components of the EV 100 and recharging of the energy storage components of the HESS 102.

Driving controls 114 are controls with which a driver of EV 100 interfaces to direct the EV 100 during driving. For example, driving controls 114 may include an acceleration control, a brake control, steering controls, and the like. The acceleration control may result in the HESS 102, and in particular to the HESS management system 112, experiencing increased demand for electrical power to be delivered to the electric motor 116 in order to accelerate the EV 100. In some examples, this power is sent through a direct current (DC) to alternating current (AC) converter 118, as the electric motor 116 is an AC powered motor. A steering control of driving controls 114 may send a signal to the HESS management system 112 indicating steering input from the driver of the EV 100 that also results in increased demand for electrical power, for the power steering. In some embodiments, this information may be used by the HESS management system 112 to modify the amount of power being delivered to the electric motor 116, for example to maintain traction of the EV 100 during a turn while the driver is also requesting acceleration of the EV 100 via the acceleration control. In some embodiments, driving controls 114 further include automatic driving assistance controls that modify the commands of the driver.

The power supply 120 functions to recharge the energy storage components 104-110. The power supply 120 may include different components that provide power to the energy storage components 104, 106 and 108. For example, the power supply 120 may include power supply from a connection 122 to an electrical grid, power from regenerative braking 124, and power from a combustion engine 126. An electrical grid may supply power through connection 122 to the HESS 102 through a wall socket, and accordingly this power supply may not be available when the HESS 102 is delivering power to a load, for example an electric motor 116, while the EV 100 is driving. Regenerative braking 124 may, for example, be a system connected to brakes in the EV 100 that converts energy absorbed during braking into electrical power and delivers that energy to the HESS 102. Combustion engine 126 may, for example, be a combustion engine in a hybrid version of EV 100, and may provide power both directly to a transmission of the vehicle 100 and/or (via an electric generator) to the HESS 102.

Interface controls 128 include controls for various electronic components of the EV 100, including at least some auxiliary devices 130, which are controlled by the driver, but which do not directly affect the motion of the EV 100. For example, interface controls 128 may include audio controls, light controls, windshield wiper controls, transmission mode controls (e.g., economy and sport mode selector), or the like. The interface controls 128 may communicate with the HESS management system 112 of HESS 102 to increase demand for power in order to drive auxiliary devices 130 that are controlled by the interface controls 128. Auxiliary devices 130 may include, for example, an audio system, headlights, signal lights, cabin lights, windshield wipers, dashboard lighting, power steering, power braking, traction control, climate control, locks, alarm systems, driving safety systems, or the like. In some embodiments, auxiliary devices 130 are controlled by interface controls 128, and are powered by HESS 102. In some embodiments, auxiliary devices 130 are indirectly controlled by the driver's input to driving controls 114, for example power steering may be automatically engaged based on the driver's input to a steering wheel, traction control may be automatically engaged based on the driver's input to the steering wheel and to an accelerator or brake control, or the like. In other embodiments, auxiliary devices are controlled by sensors 132, which may also be powered by HESS 102.

Although FIG. 2 illustrates one example of an EV 100, various changes may be made to FIG. 2. For example, the EV 100 could include more or fewer components in any suitable arrangement. FIG. 2 does not limit the scope of this disclosure to any particular configuration of an EV 100. While FIG. 2 illustrates one operational environment in which various features disclosed in this disclosure may be employed, these features could also be used in any other suitable system. It is understood that a HESS such as the HESS 102 may be used in other environments outside of an EV 100. For example, a HESS 102 may be used to power stationary, remote devices that are unable to obtain consistent power supply from, for example, a power grid. Such a remote device might be, for example, a radio tower. The power supply connection 120 of the radio tower may be a solar panel array or other inconsistent energy source.

Figure 3:
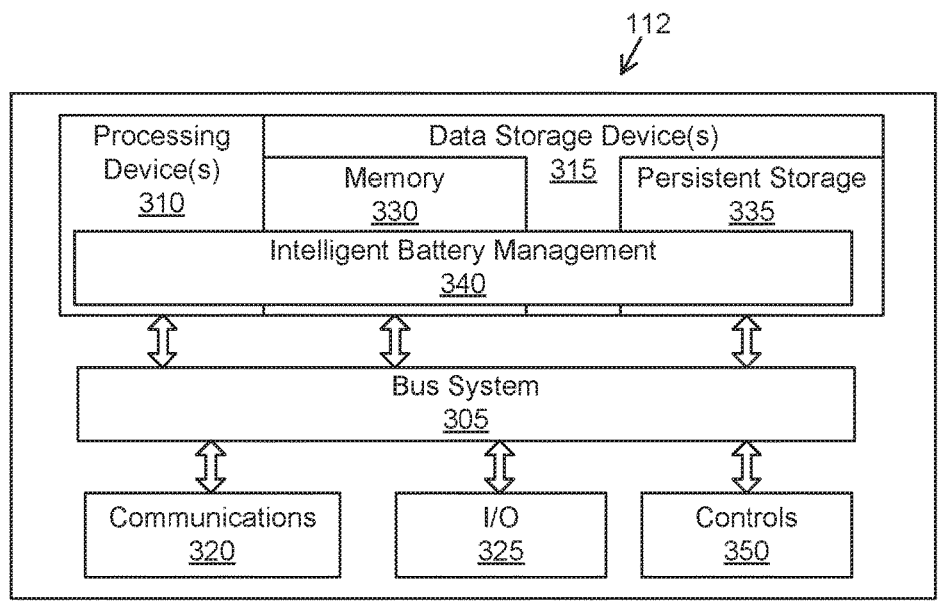
FIG. 3 is a block diagram of an exemplary HESS management system in accordance with the present disclosure.

FIG. 3 is a block diagram of an exemplary HESS management system in accordance with the present disclosure. In this example, the HESS management system 112 is a computing or processing system similar in at least some respects to a laptop or desktop computer. The HESS management system 112 may be a specially designed computing device or system located in an EV 100 (shown in FIG. 2), or may be implemented on a more general computing device in an EV 100 using specialized programming.

As shown in FIG. 3, the HESS management system 112 includes a bus system 305, which supports communication between at least one processing device 310, at least one storage device 315, at least one communications unit 320, at least one input/output (I/O) unit 325, and controls 350. The HESS management system 112 comprises an intelligent battery management system (BMS) 340 that may take the form, as illustrated in FIG. 3, of a set of instructions and associated data stored data storage devices 315 and executed by processing device(s) 310 to generate control signals output on controls 350. The instructions and associated data forming BMS 340 may be stored in persistent (non-volatile) storage 335 and copied into memory 330 during operation. The processing device(s) 310 execute the instructions and use the associated data that have been loaded into memory 330 from persistent storage 335. The processing device(s) 310 may include any suitable number(s) and type(s) of processors or other devices in any suitable arrangement. Examples of suitable processing device(s) 310 include programmable microprocessors, microcontrollers, digital signal processors, field programmable gate arrays, application specific integrated circuits, and discrete circuitry. The memory 330 and persistent storage 335 are merely examples of storage devices 315, which represent any structure(s) capable of storing and facilitating retrieval of information (such as data, past operational history of the energy storage components, program code or instructions, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a read only memory, hard drive, Flash memory, or optical disc.

The communications unit 320 supports communications with other systems or devices. For example, the communications unit 320 could include a network interface card for a wired multi-station communications network or a wireless transceiver facilitating communications over a wireless network. The communications unit 320 may support communications through any suitable physical or wireless communication link(s). In some embodiments, the communications unit 320 interfaces with energy storage components 104, 106 and 108 to gather information about their status and to controls 350 for controlling the discharge of power from the energy storage components 104, 106 and 108, as will be further described below. Controls 350 are suitable controls for switching energy storage components 104, 106 and 108 into or out of connection with load(s) 116, 130. Accordingly, controls 350 include at least switches selectively controlled by HESS management system 112 and BMS 340 to energy storage components 104, 106 and 108 individually or in various combinations to load(s) 116, 130. In alternative embodiments, controls 350 are connected directly to processing device(s) 310 through, for example, a switch matrix separate from bus system 305.

The I/O unit 325 allows for input and output of data (including instructions for updating BMS 340). For example, the I/O unit 325 may provide a connection for user input through a keyboard, mouse, keypad, touchscreen, switches, or other suitable input device, individually or in selected combinations. The I/O unit 325 may also send output to a display, printer, wireless transceiver, or other suitable output device, individually or in selected combinations. For example, the I/O unit 325 may send output to a display screen inside of an EV 100 to provide information to a driver about the status of the HESS 102.

The intelligent BMS 340 monitors energy storage components 104, 106, 108 of the HESS 102 and determines how to charge each component from power supply 120 and discharge the component(s) (individually or in combination) based on power demands from a load(s) 116, 130. In some embodiments, the BMS 340 contains static logic that dictates the charging and discharging behavior of the HESS 102. In other embodiments, the BMS 340 contains logic that dynamically adjusts as the BMS 340: learns the usage patterns of the device (e.g., the driving patterns of an EV 100) or when the BMS 340 has prior knowledge of the upcoming route or driving conditions (e.g., through GPS routing, historical time-of-day route information for drives to or from work, live traffic information, weather forecasts, and/or topological information) which may allow the BMS 340 to predict future usage; measures the state of health of energy storage components 104, 106 and 108 (e.g., levels of capacity degradation); measures the temperature of energy storage components 104, 106 and 108; or the like.

FIGS. 4A-4D are graphs illustrating one example of the charge and discharge behavior for a HESS based on the control by a HESS management system in accordance with the present disclosure. In this example, used solely for purposes of explaining the charge and discharge management contemplated by the present disclosure, the HESS 102 is comprised of a medium energy extra-long cycle life battery 104, a general purpose Li-ion battery 106, and an ultra-high energy low cycle life battery 108.

Figure 4A:
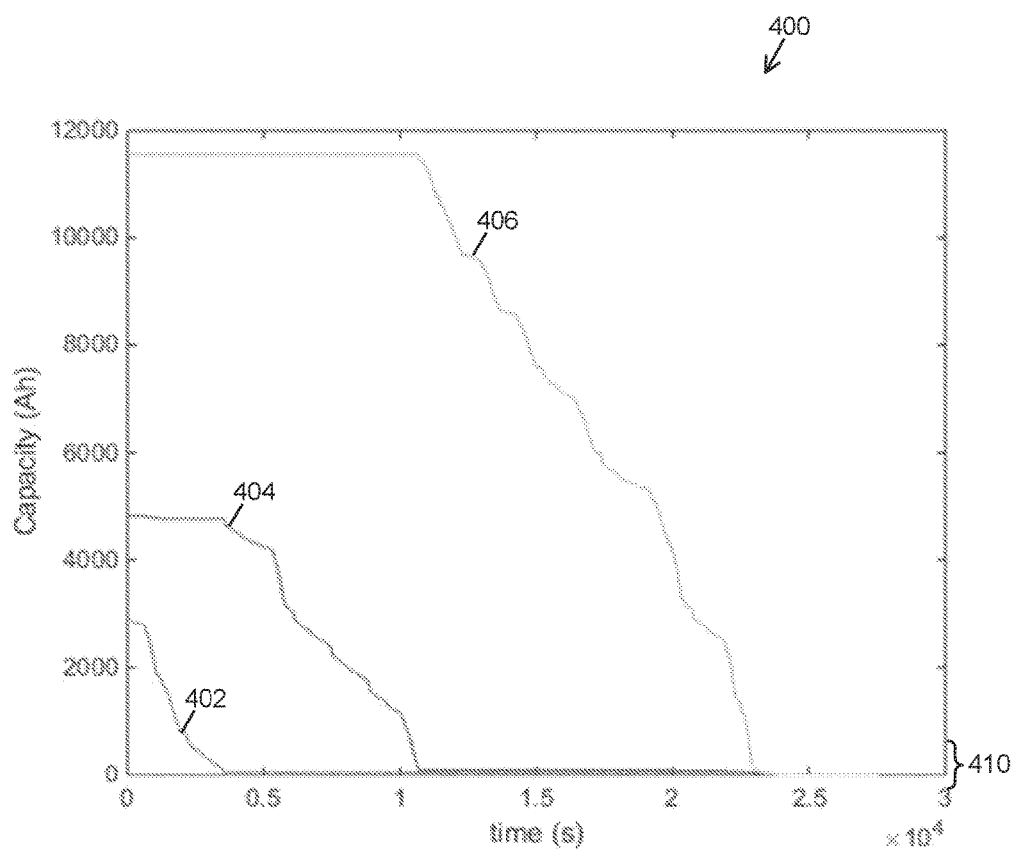
FIGS. 4A-4D are graphs illustrating one example of the charge and discharge behavior for a HESS based on the control by a HESS management system in accordance with the present disclosure.

FIG. 4A illustrates a graph 400 of the example discharge behavior of a HESS 102 according to one embodiment of the present disclosure. The y-axis of graph 400 represents the current energy capacity (i.e., amount of energy stored) for storage components 104, 106 and 108, while the x-axis represents time. In this example, the HESS 102 is in an EV 100 that is driven until all storage components 104, 106 and 108 are completely depleted. Trace 402 represents the capacity over time of medium energy extra-long cycle life battery 104, trace 404 represents the capacity over time of general purpose Li-ion battery 106, and trace 406 represents the capacity over time of ultra-high energy low cycle life battery 108. In this example, the logic of HESS management system 112 dictates that power demand of load(s) 116, 130 should first be fulfilled, to the extent possible, by discharging power from medium energy extra-long cycle life battery 104. If the medium energy extra-long cycle life battery 104 alone cannot fulfill the power demand, then power is discharged as needed from general purpose Li-ion battery 106, and if the combination of medium energy extra-long cycle life battery 104 and general purpose Li-ion battery 106 cannot fulfill the power demand, then energy is also discharged as needed from ultra-high energy low cycle life battery 108 in combination with the medium energy extra-long cycle life battery 104 and the general purpose Li-ion battery 106. In some embodiments, the order of discharge of storage components 104, 106 and 108 is dynamically adjusted by the HESS management system 112 based on one or more of remaining capacity, cycle life (or other cycle characteristics), energy density, historical condition, usage history, or the like of each respective component.

This discharge behavior can be seen in FIG. 4A. The capacity of medium energy extra-long cycle life battery 104 (the discharge of which is represented by trace 402) is depleted before the capacity of general purpose Li-ion battery 106 (the discharge of which is represented by trace 404), and the capacity of general purpose Li-ion battery 106 is depleted before the capacity of ultra-high energy low cycle life battery 108 (the discharge of which is represented by trace 406). It can also be seen in FIG. 4A that the capacity of the general purpose Li-ion battery 106 and the ultra-high energy low cycle life battery 108 remain nearly full until the medium energy extra-long cycle life battery 104 is substantially depleted, and furthermore the capacity of ultra-high energy low cycle life battery 108 remains nearly full until the general purpose Li-ion battery 106 is substantially depleted.

Figure 4B:
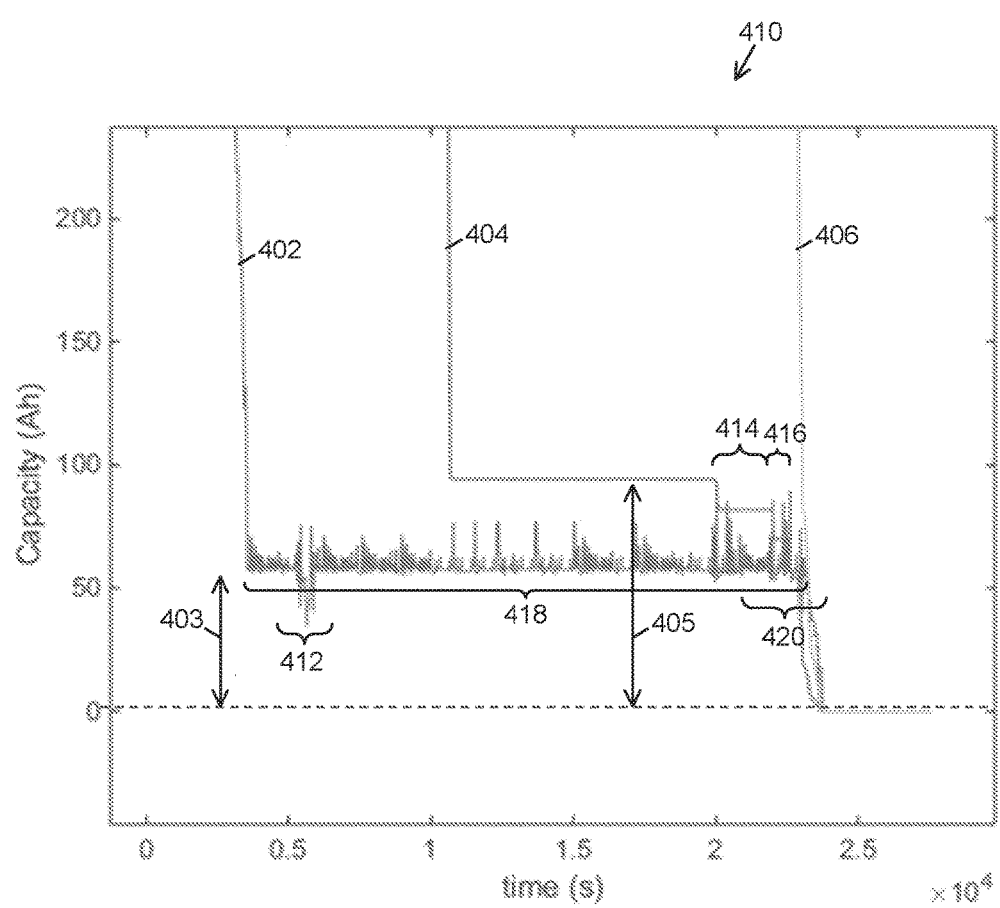

FIG. 4B is an enlarged view 410 of a portion of FIG. 4A, focused on the corresponding region of FIG. 4A. In the present exemplary embodiment, the energy storage components 104, 106 and 108 have a designated reserve capacity (alternatively, a reserve "level"). Each energy storage component may optionally have a different reserve capacity. For example, medium energy extra-long cycle life battery 104 may have a reserve capacity 403 (e.g., 5%), which is different from reserve capacity 405 (e.g., 8%) of general purpose Li-ion battery 106. Alternatively, the reserve capacity of each respective energy storage component 104, 106 may be set to a same proportion of maximum capacity (e.g., 5%) of maximum capacity, which may result in varying reserve capacities due to varying maximum capacities of energy storage components 104 and 106. The ultra-high energy low cycle life battery 108, the energy storage component to be depleted last in the example being described, may not have a reserve capacity. Preferably, however, the ultra-high energy low cycle life battery 108 has a reserve capacity that is not evident from the graph of FIG. 4B for reasons that will be explained below.

Once any of the energy storage components 104, 106 and 108 is depleted to the respective reserve capacity, the HESS management system 112 treats that component as empty (i.e., no power is discharged from that component) outside of special circumstances. Such special circumstances include temporary spikes in power demand from load(s) 116, 130 that would exceed the total power output capability of the remaining energy storage components 104, 106 and 108. The reserve capacity allows the HESS 102 to maintain enough potential power output to meet such temporary spikes in power demand, even as the total capacity of HESS 102 is nearly depleted. By way of example, such a power demand spike is evident is region 412, where HESS management system 112 discharges some energy from medium energy extra-long cycle life battery 104 even though that causes a drop below the corresponding reserve capacity 403, and in regions 414 and 416, where HESS management system 112 discharges energy from general purpose Li-ion battery 106 even though that causes a drop below the corresponding reserve capacity 405.

FIG. 4B also illustrates the effect of receiving energy from the power supply 120 that is operable to recharge the HESS 102 during use. For example, regenerative braking 124 or a combustion engine 126 each may operate to supply power to HESS 102 during operation of an EV 100. In this embodiment, HESS management system 112 is programmed to direct power from power supply 120 to medium energy extra-long cycle life battery 104 (i.e., to the energy storage component that is first in order to be discharged). The recharging of medium energy extra-long cycle life battery 104 is evident throughout region 418 as the capacity drops to and then increases above the reserve capacity 403. Since the medium energy extra-long cycle life battery 104 has an extra-long cycle life, that component will experience the least degradation in performance from repeated charge-discharge-recharge cycles. Increases in the capacity of medium energy extra-long cycle life battery 104 illustrate power that the HESS management system 112 causes to be stored in medium energy extra-long cycle life battery 104 from power supply 120. This causes medium energy extra-long cycle life battery 104 to rise above the respective reserve capacity 403. Accordingly, medium energy extra-long cycle life battery 104 is no longer treated as empty by the HESS management system 112. As can be seen in trace 402, after each increase, the HESS management system 112 once again supplies the power demand of load(s) 116, 130 from only the medium energy extra-long cycle life battery 104 (as possible) until the remaining capacity of that component is again depleted to the respective reserve capacity 403.

Figure 4C:
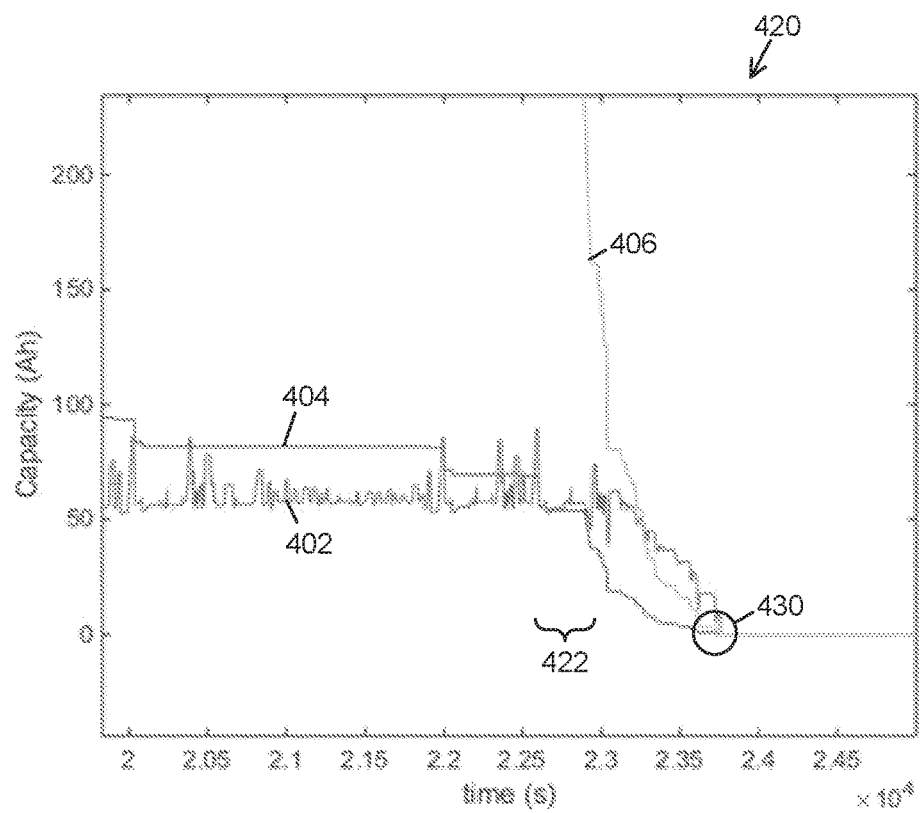

FIG. 4C is an enlarged view 420 of FIG. 4B, focused on the corresponding region of FIG. 4B. In region 422, medium energy extra-long cycle life battery 104 and general purpose Li-ion battery 106 have each reached their reserve capacities 403 and 405, respectively, and ultra-high energy low cycle life battery 108 has either reached its respective reserve capacity or is nearly completely discharged. In some embodiments, ultra-high energy low cycle life battery 108 is considered nearly completely discharged when discharged to an amount that proportional to the reserve capacities of other energy storage components (for example, 5% of maximum capacity) in the HESS 102.

Once each of the storage components 104, 106 and 108 are nearly completely discharged (e.g., discharged to 5% of maximum capacity), HESS management system 112 begins to discharge from each energy storage component together. The energy the storage components 104, 106 and 108 may be discharged together in proportion to the remaining capacity in each (or in accordance with other predefined discharge rates) until all three energy storage components 104, 106 and 108 are completely depleted, so that all three energy storage components 104, 106 and 108 reach complete discharge at substantially the same time, as illustrated at point 430. In alternative embodiments, the HESS management system 112 may fulfill one-third of the power demand by load(s) 116, 130 from each of the energy storage components 104, 106 and 108. In some such embodiments, the HESS management system 112 may continuously cycle between each energy storage component 104, 106 and 108 for equal amounts of time to supply the power demand from the load(s) 116, 130, to ensure availability of as much potential instantaneous power output as possible (e.g., the combined energy of each energy storage component 104-108) right up to the time that all power is discharged from the HESS 102.

It is understood that at any point in FIGS. 4A-4C, power supply 120 may provide power to the HESS 102 via the HESS management system 112, which may directs the energy into one or more of the energy storage components 104, 106 and 108. This power may be supplied by regenerative braking 124, combustion engine 126, or any other appropriate power source. As described above, in this example the HESS management system 112 directs any power supplied by power supply 120 into medium energy extra-long cycle life battery 104, which is designed to have the highest cycle life of the various energy storage components 104, 106 and 108 of the HESS 102.

Figure 4D:
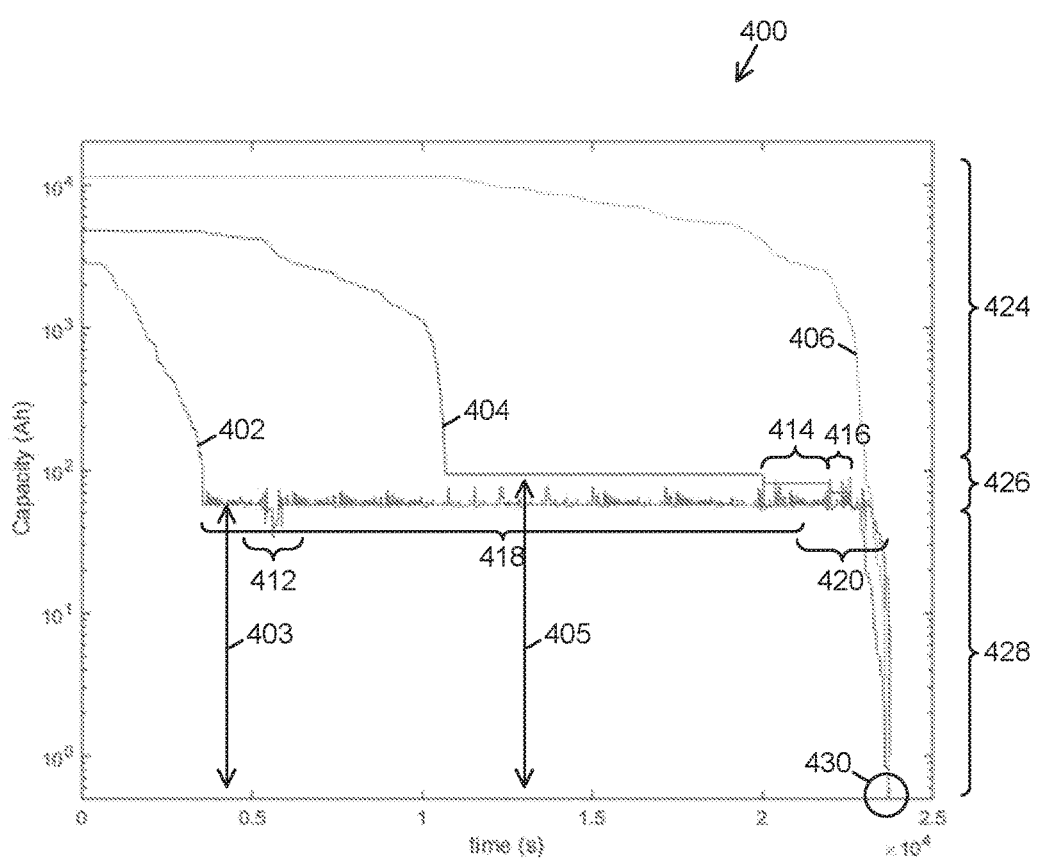

FIG. 4D is the graph 400 with the y-axis logarithmically scaled to more clearly illustrate the discharge behavior of the HESS 102 as controlled by the HESS management system 112. In region 424, the HESS management system 112 causes the storage components 104, 106 and 108 to discharge in a preferential order (104 first, 106 second, 108 last) when all of the storage components 104, 106 and 108 have more than reserve capacity remaining. In region 426, the HESS management system 112 avoids discharging energy from energy storage components 104 and 106 whenever they are at their respective reserve capacities 403 and 405, except in situations such (for example) as region 412, which represents a temporary spike in power demand requiring more power than is available from energy storage components that are above their respective reserve capacity. Regions 414 and 416 illustrate that spikes in energy demand are satisfied by drawing power from medium energy extra-long cycle life battery 106, even though that component is at its respective reserve capacity.

In region 428, illustrates the HESS management system 112 causes the energy storage components 104, 106 and 108 to discharge together until the storage components 104, 106 and 108 are completely depleted at point 430.

Figure 5A:
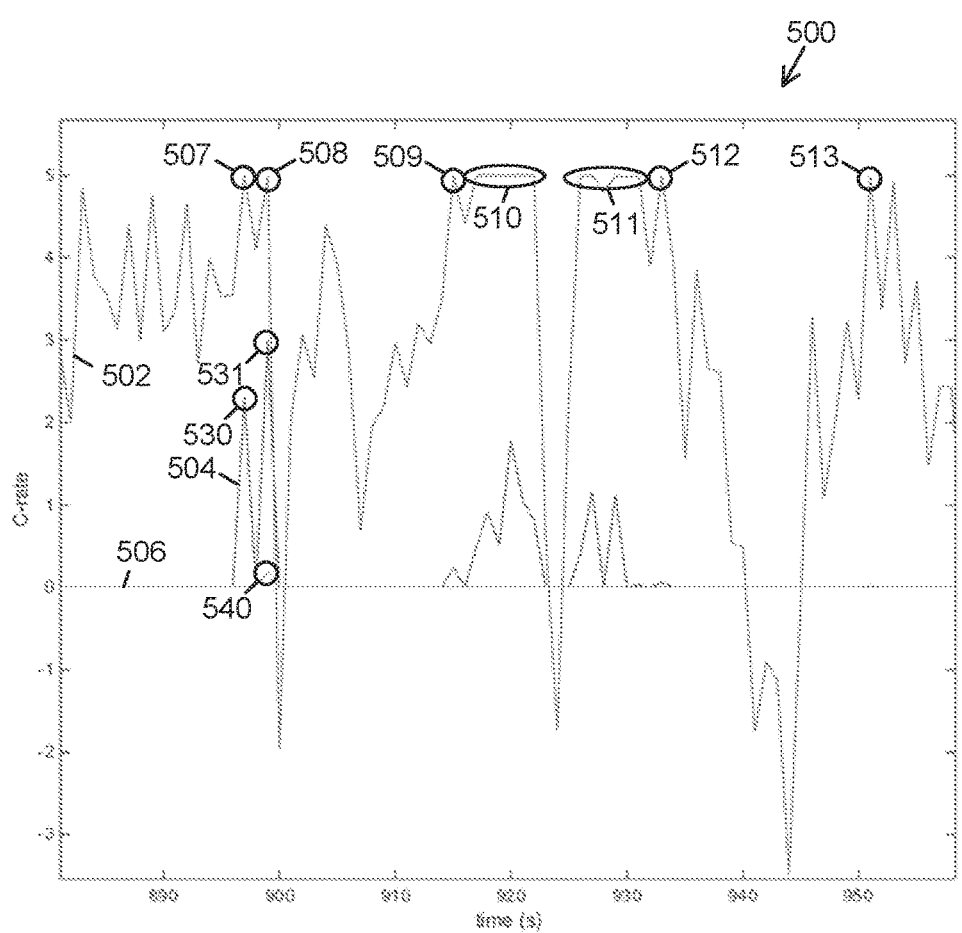
FIGS. 5A-5C are graphs of exemplary charging and discharging rate behavior for a HESS based on the control of an intelligent battery management system of a HESS management system according to this disclosure.
Figure 5B:
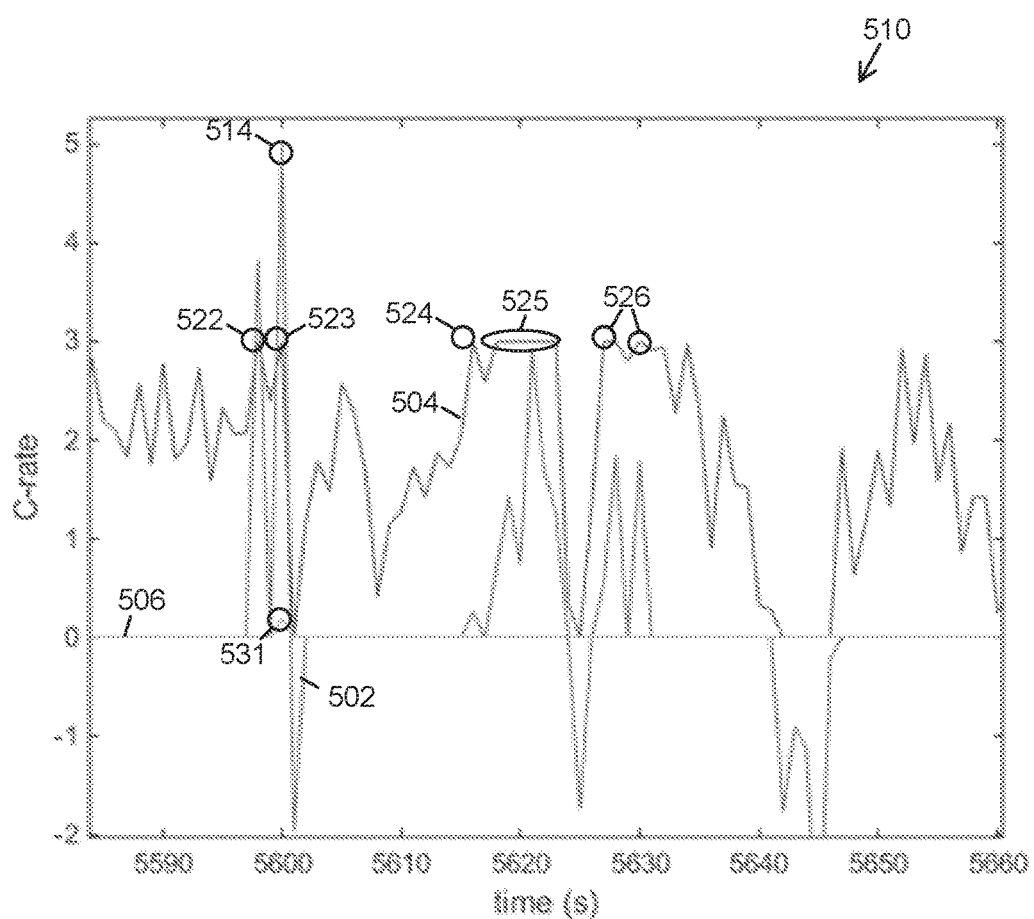
Figure 5C:
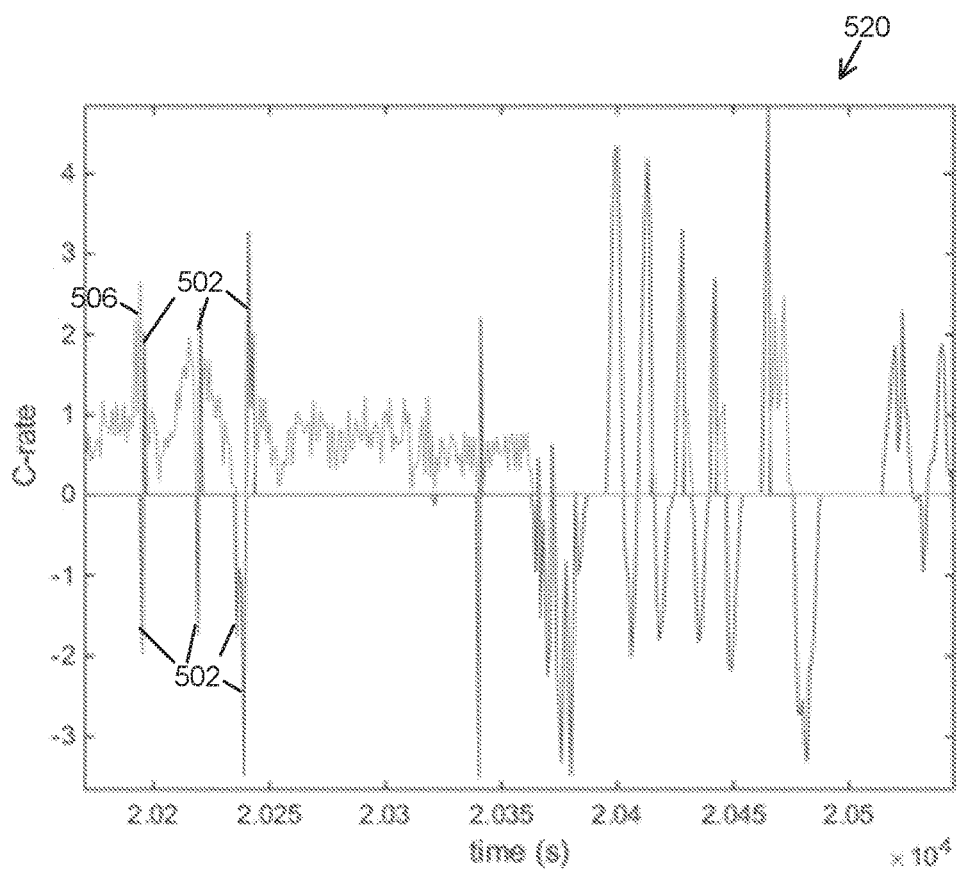

FIGS. 5A-5C are graphs of exemplary charging and discharging rate behavior for a HESS based on the control of an intelligent battery management system of a HESS management system according to this disclosure. In this example, as in the example of FIGS. 4A-4D, the HESS 102 is comprised of a medium energy extra-long cycle life battery 104, a general purpose Li-ion battery 106, and an ultra-high energy low cycle life battery 108. The discharge of medium energy extra-long cycle life battery 104 is represented by trace 502; the discharge of general purpose Li-ion battery 106 is represented by trace 504); and the discharge of general purpose Li-ion battery 106 is represented by trace 506. The y-axes of graphs 500, 510, and 520 represent the rate of charge and discharge (the C-rate) of energy storage components 104, 106 and 108 of the HESS 102, while the x-axes represent time. A positive C-rate indicates discharge and a negative C-rate indicates charge. In this example, as in the example of FIGS. 4A-4D, the HESS 102 is in an EV 100. Trace 502 (like trace 402 in FIGS. 4A-4D) is power supplied from the medium energy extra-long cycle life battery 104; trace 504 (like trace 404 in FIGS. 4A-4D) is power supplied from the general purpose Li-ion battery 106; and trace 506 (like trace 406 in FIGS. 4A-4D) is power supplied from the ultra-high energy low cycle life battery 108.

FIG. 5A is a graph 500 of exemplary discharge rate behavior for the HESS 102 while all energy storage components 104, 106 and 108 have more than reserve capacity available. Each energy storage component 104, 106 and 108 has a discharge rate limit set by HESS management system 112 and/or based on the structure of the respective component. In the example shown, medium energy extra-long cycle life battery 104 has a discharge rate limit of "5" while general purpose Li-ion battery 106 has a discharge rate limit of "3," where the numeric values −5 through +5 represent a rate in C-rate units. The C-rate is a normalized unit that is defined such that a value of "1" indicates the discharge rate at which the usable energy in the battery would be depleted in one hour for each respective energy storage types. The absolute discharge rate in Amperes/hour at a C-rate of "1" for each energy storage component may be different and will be determined by the total energy storage capacity of each energy storage component. The HESS management system 112 will not allow energy to be discharged from an energy storage component 104, 106 or 108 above its respective discharge rate limit. In some embodiments, the HESS management system 112 may dynamically adjust the rate limit of one or more energy storage components 104, 106 and 108 based on one or more of its remaining capacity, cycle life (or other cycle characteristics), energy density, usage history, state of health, temperature, or the like.

For simplicity, each energy storage component is described above as having a single discharge rate limit. However, the embodiments described above are not intended to limit the scope of this disclosure to a single discharge rate limit for any energy storage component. Those skilled in the art understand that a given energy storage component could have different discharge rate limits that apply in different situations. For example, an energy storage component may have different continuous and instantaneous (or peak) discharge rate limits. This may be due to thermal concerns, material properties, physical properties, past operation, state-of-charge, state-of-health, or the like. As another example, an energy storage component may be able to deliver bursts of power at a very high rate, but may not be able to dissipate heat generated while delivering power at that very high rate for a sustained period of time. In such situations, a HESS management system 112 may define a continuous discharge rate limit for the energy storage component that is lower than a peak discharge rate limit. In some embodiments, a HESS management system 112 may create a discharge rate limit function for an energy storage component that dynamically defines acceptable discharge rate limits based on at least an expected duration of discharge, or that defines a maximum time-average rate of discharge. These and other variants that are obvious to those skilled in the art are considered to be included within scope of the present disclosure.

In this example, as in the example of FIGS. 4A-4D, in response to the power demand of load(s) 116, 130, the HESS management system 112 causes energy to be discharged from the medium energy extra-long cycle life battery 104 first. When the power demand of load(s) 116, 130 exceeds the discharge rate limit of the medium energy extra-long cycle life battery 104, as shown at regions 507-513, the HESS management system 112 caps the power discharge from medium energy extra-long cycle life battery 104 (if necessary) and causes power to be discharged from one or both of general purpose Li-ion battery 106 and ultra-high energy low cycle life battery 108 to meet the power demand. Such a circumstance occurs at the time of regions 507 and 530 in FIG. 5A. Similarly, when the power demand of load(s) 116, 130 exceeds the combined discharge rate limits of the medium energy extra-long cycle life battery 104 and of the general purpose Li-ion battery 106, the HESS management system 112 caps the power discharge from the medium energy extra-long cycle life battery 104 and the general purpose Li-ion battery 106 (if necessary) and causes power to be discharged from the ultra-high energy low cycle life battery 108. Such a circumstance occurs at the time of regions 508, 531 and 540 in FIG. 5A.

FIG. 5A also illustrates the effects of receiving energy from power supply 120 that is operable to recharge the HESS 102 during use. For example, regenerative braking 124 or a combustion engine 126 each may operate to supply power to HESS 102 during operation of an EV 100. Each energy storage component 104, 106 and 108 has a charge rate limit set by HESS management system 112 and/or based on the structure of the respective component In the example shown, HESS management system 112 is programmed to direct power from power supply 120 to medium energy extra-long cycle life battery 104 (i.e., to the energy storage component that is first to be discharged). In each region where the discharge rate in FIG. 5A is negative, the medium energy extra-long cycle life battery 104 is being charged by power supply 120. In some embodiments, energy from power supply 120 may recharge other energy storage components (e.g., general purpose Li-ion battery 106) when the medium energy extra-long cycle life battery 104 reaches full capacity. In some embodiments, energy from power supply 120 may recharge other energy storage components (e.g., general purpose Li-ion battery 106) when the recharge power available is greater than the charge rate limits of the medium energy extra-long cycle life battery 104, in which case a cascading charge preference order among the energy storage types may be instituted similar to the discharge preference order described above. In some embodiments, an energy storage component such as the medium energy extra-long cycle life battery 104 will only be charged while there is no power demand on the energy storage component(s). For example, during regenerative braking 124, no power is being drawn by a motor to accelerate the EV 100 and energy from power supply 120 is used to recharge the medium energy extra-long cycle life battery 104. Similarly, when combustion engine 126 is providing power to accelerate the EV 100 instead of the HESS 102, excess energy from the combustion engine 126 is supplied to recharge one of the energy storage components.

For simplicity, each energy storage component is described above as having a single charge rate limit. However, the embodiments described above are not intended to limit the scope of this disclosure to a single charge rate limit for any energy storage component. Those skilled in the art understand that a given energy storage component could have different charge rate limits that apply in different situations. For example, an energy storage component may have different continuous and instantaneous (or peak) charge rate limits. This may be due to thermal concerns, material properties, physical properties, past operation, state-of-charge, state-of-health, or the like, as described above with respect to the description of varying discharge rate limits of the energy storage components.

FIG. 5B is a graph 510 of exemplary discharge rate behavior for the HESS 102 at a period subsequent to the period of FIG. 5A, after the medium energy extra-long cycle life battery 104 has reached its reserve capacity, but while the general purpose Li-ion battery 106 and the ultra-high energy low cycle life battery 108 have capacity remaining. Since the medium energy extra-long cycle life battery 104 is at (or below) reserve capacity, the HESS management system 112 treats the component as empty except in special situations. Accordingly, in response to power demand from load(s) 116, 130, the HESS management system 112 causes energy to be discharged from the general purpose Li-ion battery 106 first. In this embodiment, the HESS management system 112 is still programmed to attempt to draw energy from the medium energy extra-long cycle life battery 104 first. In that manner, when the medium energy extra-long cycle life battery 104 is recharged to a capacity above the reserve capacity, power is supplied to the load(s) 116, 130 from that component first until the medium energy extra-long cycle life battery 104 is once again depleted to the respective reserve capacity. Such a circumstance is not shown in FIG. 5B, in which the power demand is met first from the general purpose Li-ion battery 106. While the medium energy extra-long cycle life battery 104 is recharged as possible from power supply 120, in this period of FIG. 5B, the medium energy extra-long cycle life battery 104 does not receive enough charge to rise above its respective reserve capacity, and accordingly HESS management system 112 still meets demand from load 202 with power discharged from general purpose Li-ion battery 106, so long as the power discharge from general purpose Li-ion battery 106 is below the respective discharge rate limit.

When the general purpose Li-ion battery 106 reaches its respective discharge rate limit, HESS management system 112 caps the power discharged from the general purpose Li-ion battery 106 (if necessary) and causes power to additionally be discharged from the medium energy extra-long cycle life battery 104 to meet the demand of load(s) 116, 130, as shown at regions 522-526. Even though the medium energy extra-long cycle life battery 104 is at or below reserve capacity, power from that component is used before power from the ultra-high energy low cycle life battery 108. When the power demand of the load(s) 116, 130 exceeds the combined rate limits of the general purpose Li-ion battery 106 and the medium energy extra-long cycle life battery 104, the HESS management system 112 caps the power discharged from those two components (if necessary) and additionally causes power to be discharged from ultra-high energy low cycle life battery 108. Such a circumstance occurs at the time of regions 512, 523 and 531 in FIG. 5B.

FIG. 5C is a graph 520 of exemplary discharge rate behavior for the HESS 102 at a period subsequent to the period of FIG. 5B, after both the medium energy extra-long cycle life battery 104 and the general purpose Li-ion battery 106 have been depleted to their respective reserve capacities, but while ultra-high energy low cycle life battery 108 has capacity remaining. Since the medium energy extra-long cycle life battery 104 and the general purpose Li-ion battery 106 are at their respective reserve capacities, the HESS management system 112 treats both components as empty. Accordingly, in response to power demand from load(s) 116, 130, the HESS management system 112 causes energy to be discharged from the ultra-high energy low cycle life battery 108. When the medium energy extra-long cycle life battery 104 is recharged by power supply 120 to a capacity above its respective reserve capacity, power is supplied to the load(s) 116, 130 from that component first until the medium energy extra-long cycle life battery 104 is once again depleted to the respective reserve capacity, as shown. In the example of FIG. 5C, there are no instances where the ultra-high energy low cycle life battery 108 meets it respective discharge rate limit. However, in such a case, the discharge rate of ultra-high energy low cycle life battery 108 would be capped at the respective discharge rate limit and power would be additionally drawn first from the medium energy extra-long cycle life battery 104 and then from the general purpose Li-ion battery 106 as necessary per their respective discharge rate limits.

Figure 6:
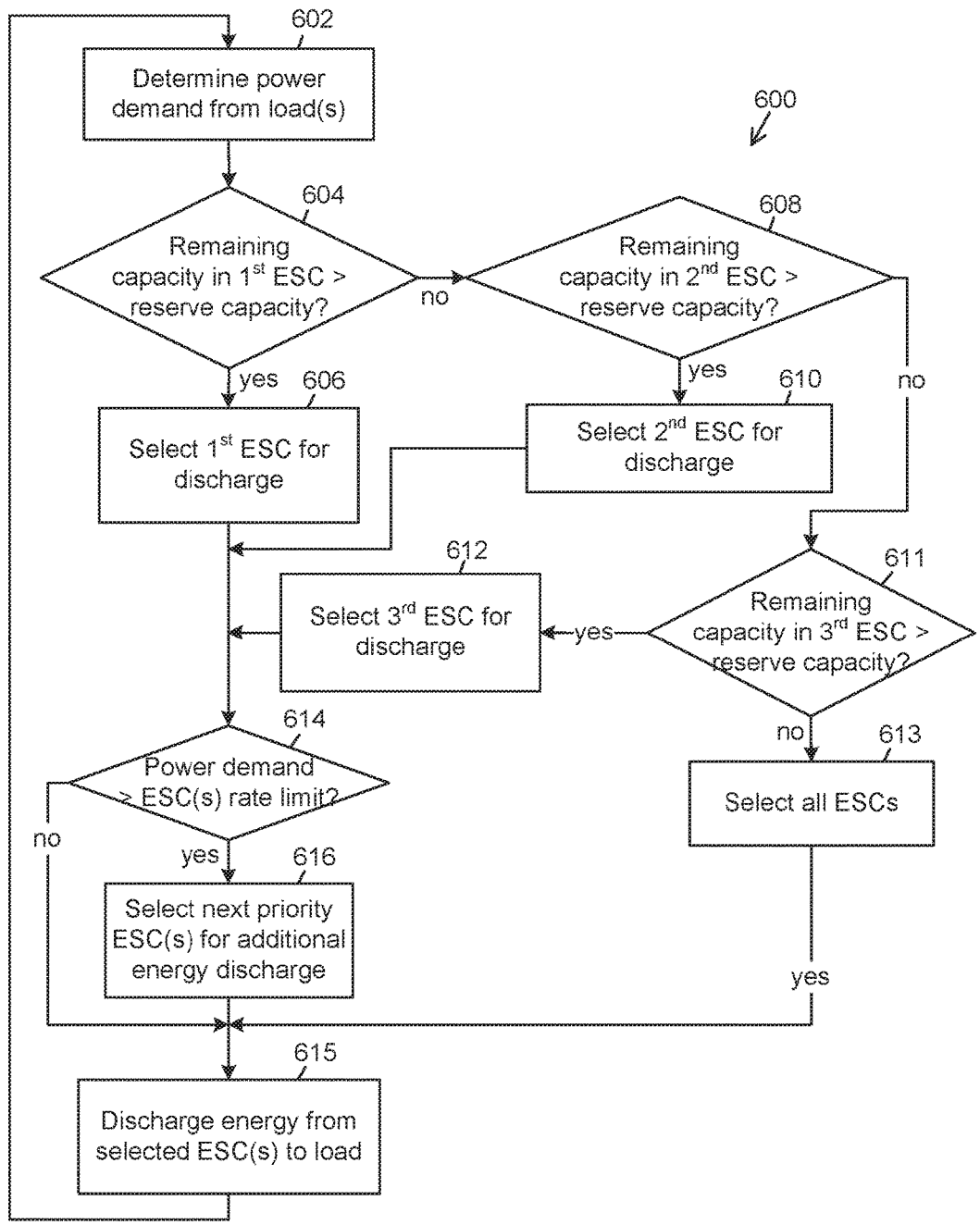
FIG. 6 is a high level flowchart for an exemplary process of managing the charging and discharging of a HESS according to this disclosure.

FIG. 6 is a high level flowchart for an exemplary process of managing the charging and discharging of a HESS according to this disclosure. In the exemplary process shown, the HESS 102 is composed of three energy storage components ("ESC" in FIG. 6), corresponding to energy storage components 104, 106 and 108. It will be understood, however, that any number of energy storage components may be included in a HESS 102 managed according to the exemplary process 600 of FIG. 6 or variants that will be evident to those skilled in the art. Each of the energy storage components 104, 106 and 108 has a respective energy capacity, energy delivery rate, energy density, specific energy, usage history, and cycle characteristic (e.g., cycle life). The exemplary process 600 is performed by the intelligent BMS 340 of a HESS management system 112. The energy storage components 104, 106 and 108 are prioritized in a primary priority order of first, second and third for supply of energy to meet the present power demand when all components are above the corresponding reserve capacity, and in a secondary priority order when one or more energy storage components 104, 106 and 108 are below the corresponding reserve capacity. In the example being described, the primary priority order is energy storage component 104 first, energy storage component 106 second, and energy storage component 108 third. The secondary priority order when only energy storage component 104 is below the corresponding reserve capacity is energy storage component 106 first, energy storage component 104 second, and energy storage component 108 third. The secondary priority order when both energy storage components 104 and 106 are below the corresponding reserve capacities is energy storage component 108 first, energy storage component 104 second, and energy storage component 106 third.

Beginning at block 602, the intelligent BMS 340 determines a present power demand of a load, such as load(s) 116, 130. The load may be, for example, a dynamically (or instantaneously) variable electrical power load such as may be drawn by an EV engine and other electrically powered systems within an EV 100. Those skilled in the art will understand that the determination of the present power demand may be made very frequently, such as many times per second. In fact, the entire process 600 may be completely performed in a very short time and repeated iteratively many times per second in order to adequately meet the present power demand of the load, for reliable operation of (for example) the EV 100.

The present power demand may be translated by the intelligent BMS 340 into a discharge rate for one or more energy storage components that are necessary to meet the power demand. At decision block 604, the intelligent BMS 340 determines whether a first energy storage component (e.g., medium energy extra-long cycle life battery 104) has remaining stored energy capacity at or above a respective reserve capacity, which may be either statically set or dynamically adjusted based on one or more of energy capacity, energy delivery rate, energy density, specific energy, usage history, state of health, temperature, or cycle characteristic of the first energy storage component. In some embodiments the intelligent BMS 340 is programmed to prioritize the first energy storage component for energy discharge, if possible. This prioritization may be based on features such as energy capacity, energy delivery rate, energy density, state of health, temperature, and cycle characteristics of the first energy storage component.

If, at decision block 604, the first energy storage component has remaining stored energy capacity at or above the respective reserve capacity, the intelligent BMS 340, at block 606, selects the first energy storage component as a source for energy discharge. If, at decision block 604, the first energy storage component is below a corresponding reserve capacity, the intelligent BMS 340 determines, at decision block 608, whether a second energy storage component (e.g., general purpose Li-ion battery 106) has remaining stored energy capacity at or above a respective reserve capacity, which is also may be either statically set or dynamically adjusted based one or more of energy capacity, energy delivery rate, energy density, specific energy, usage history, state of health, temperature, or cycle characteristic of the second energy storage component. In some embodiments, the intelligent BMS 340 is programmed to prioritize the second energy storage component after the first energy storage component for energy discharge if possible. This prioritization may be based on features such as energy capacity, energy delivery rate, energy density, state of health, temperature, and cycle characteristics of the second energy storage component.

If, at decision block 608, the second energy storage component has remaining stored energy capacity at or above the respective reserve capacity, the intelligent BMS 340, at block 610, selects the second energy storage component as a source for energy discharge. If, at decision block 608, the second energy storage component is below a respective reserve capacity, the intelligent BMS 340, at decision block 611, determines whether a third energy storage component (e.g., ultra-high energy low cycle life battery 108) has remaining stored energy capacity at or above a respective reserve capacity. In some embodiments, the reserve capacity of the third energy storage component may be functionally similar to the reserve capacities of the first and second energy storage components, or in proportion to the contribution of the third energy storage component to the maximum total capacity of all energy storage components. The maximum total capacity of all energy storage components may be either statically set or dynamically adjusted based one or more of energy capacity, energy delivery rate, energy density, specific energy, usage history, state of health, temperature, or cycle characteristic of the energy storage components. In some embodiments, the intelligent BMS 340 is programmed to prioritize the third energy storage component after the first and second energy storage components for energy discharge if possible. This prioritization may be based on features such as energy capacity, energy delivery rate, energy density, state of health, temperature, and cycle characteristics of the third energy storage component.

If, at decision block 611, the third energy storage component has remaining stored energy capacity at or above the corresponding reserve capacity, the intelligent BMS 340, at block 612, selects the third energy storage component as a source for energy discharge. If, at decision block 611, the third energy storage component is below the respective reserve capacity, the intelligent BMS 340, at block 613, selects all of the energy storage components together as sources for energy discharge and, at block 615, causes the selected energy storage component(s) to discharge energy to the load to meet the power demand.

While the steps of blocks 604, 608 and 611 are depicted as sequential in FIG. 6, in practice the respective determinations may be made concurrently or in an at least partially overlapping manner. From each of blocks 606, 610 and 612, the process 600 proceeds to block 614, at which the intelligent BMS 340 determines whether the present power demand of the load exceeds a rate limit of the selected energy storage component(s) (e.g., the first, second, and/or third energy storage component(s)). In some embodiments, a rate limit for each energy storage component may be either statically set or dynamically adjusted based on one or more of the corresponding energy capacity, energy delivery rate capability, present energy density, cycle characteristics, state of health, temperature, and usage history of the respective energy storage component. The determination of block 614 may involve concurrent determination of whether the present power demand exceeds a rate limit of each individual energy storage component as well as combined rate limits of various permutations of individual energy storage components (e.g., the first and second energy storage components, the second and third energy storage components, or the first and third energy storage components). These determinations, together with the determinations of blocks 604, 608 and 611, will be used to control discharge of energy from the energy storage component(s). If, at decision block 614, the intelligent BMS 340 determines that the present power demand does not exceed the rate limit of the selected energy storage component, the intelligent BMS 340, at block 615, causes the selected energy storage component(s) to discharge energy to the load to meet the power demand.

If, at decision block 614, the intelligent BMS 340 determines that the present power demand does exceed the rate limit of a selected energy storage component, the intelligent BMS 340, at block 616, selects the next priority energy storage component to additionally discharge energy to the load. As evident from the discussion of FIGS. 4A-4D and 5A-5C above, the intelligent BMS 340 may cause more than one of the energy storage components to discharge energy together in order to meet the present power demand. The selection of the next priority energy storage components at block 616 will depend in part upon which energy storage components are at or below the corresponding reserve capacity, as determined at blocks 604, 608 and 611. For example, as discussed in connection with FIG. 5A, if all energy storage components are above the corresponding reserve capacities and the present power demand exceeds the rate limit of the first energy storage component (in priority order), power is also discharged from the second energy storage component (together with the first energy storage component) and, if necessary to meet the present power demand, also the third energy storage component as well. As discussed in connection with FIG. 5B, if the first energy storage component is below the corresponding reserve capacity but the second and third energy storage components are above the corresponding reserve capacities, and the present power demand exceeds the rate limit of the second energy storage component, power is also discharged from the first energy storage component together with the second energy storage component (even though the first energy storage component is below the respective reserve capacity) and, if necessary to meet the present power demand, also the third energy storage component as well. As discussed in connection with FIG. 5C, if the first and second energy storage components are below the corresponding reserve capacities but the third energy storage component is above the corresponding reserve capacity, and the present power demand exceeds the rate limit of the third energy storage component, power is also discharged from the first energy storage component together with the third energy storage component and, if necessary to meet the present power demand, also the second energy storage component as well.

Following the selection of one or more energy storage component(s) at block 616, the intelligent BMS 340, at block 615, causes the selected energy storage component(s) to discharge energy to the load to meet the present power demand, then repeats the determination of block 602.

It should be noted that the determinations of blocks 602, 604, 608, 611 and 614, while depicted as occurring within a sequential process in FIG. 6, may be made concurrently or in an at least partially overlapping manner in practice, except to the extent that the result of one determination is necessary for another (e.g., the result for the determination of present power demand in block 602 is necessary for the determination of whether that present power demand exceeds the rate limit(s) of one or more selected energy component(s)).

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for managing a heterogeneous electrical energy storage system (HESS), the method comprising:
   determining a power demand of a dynamic electrical power load in a system having one or more rechargeable energy storage components, each of the rechargeable energy storage components having a respective capacity, energy delivery rate, energy density, specific energy, and cycle characteristic;
   in response to determining the power demand of the dynamic electrical power load, discharging one or more of the rechargeable energy storage components to supply power to the dynamic electrical power load in accordance with at least one of:
      a respective remaining capacity measured for at least some of the rechargeable energy storage components, and
      the power demand of the dynamic electrical power load relative to one or more respective rate limits currently applied to the rechargeable energy storage components.

2. The method of claim 1, wherein discharging the one or more of the rechargeable energy storage components to supply power to the dynamic electrical power load further comprises discharging the one or more rechargeable energy storage components in an order based on at least one of the respective capacities, energy delivery rates, energy densities, and cycle characteristics of the rechargeable energy storage components.

3. The method of claim 1, wherein the discharging is performed in accordance with at least the respective remaining capacity, the discharging comprising discharging the one or more rechargeable energy storage components in an order based on the respective remaining capacity measured for at least some of the rechargeable energy storage components.

4. The method of claim 3, wherein discharging the one or more rechargeable energy storage components in an order based on the respective remaining capacity further comprises:
   determining a remaining capacity for a first of the rechargeable energy storage components;
   if the remaining capacity for the first rechargeable energy storage component is at or above a threshold set for the first rechargeable energy storage component, discharging at least the first rechargeable energy storage component to supply power to the dynamic electrical power load; and
   if the remaining capacity for the first rechargeable energy storage component is below the threshold set for the first rechargeable energy storage component, discharging at least a second of the rechargeable energy storage components, but not the first rechargeable energy storage component, to supply power to the dynamic electrical power load.

5. The method of claim 4, wherein discharging the one or more rechargeable energy storage components in an order based on the respective remaining capacity further comprises:
   determining a remaining capacity for the second of the rechargeable energy storage components;
   if the remaining capacity for the second rechargeable energy storage component is at or above a threshold set for the second rechargeable energy storage component, discharging at least the second rechargeable energy storage component to supply power to the dynamic electrical power load; and
   if the remaining capacity for the second rechargeable energy storage component is below the threshold set for the second rechargeable energy storage component, discharging at least a third one of the rechargeable energy storage components, but not the second rechargeable energy storage component, to supply power to the dynamic electrical power load.

6. The method of claim 4, wherein the first rechargeable energy storage component has at least one of a higher energy delivery rate and a longer cycle characteristic than the second rechargeable energy storage component.

7. The method of claim 1, wherein the discharging is performed in accordance with at least the power demand of the dynamic electrical power load relative to the one or more respective rate limits, and each of the one or more respective rate limits is based on at least one of: a charge state of a respective one of the rechargeable energy storage components, a state of health of the respective one of the rechargeable energy storage components, past usage of the respective one of the rechargeable energy storage components, expected future usage of the respective one of the rechargeable energy storage components, and temperature of the respective one of the rechargeable energy storage components.

8. The method of claim 1, wherein the discharging is performed in accordance with at least the power demand of the dynamic electrical power load relative to the one or more respective rate limits, the discharging comprising:
comparing the power demand of the dynamic electrical power load to a rate limit currently applied to a first of the rechargeable energy storage components;
if the power demand of the dynamic electrical power load is within the rate limit currently applied to the first rechargeable energy storage component, discharging the first rechargeable energy storage component to supply power to the dynamic electrical power load; and
if the power demand of the dynamic electrical power load is above the rate limit currently applied to the first rechargeable energy storage component, discharging both the first rechargeable energy storage component and at least one other of the rechargeable energy storage components to supply power for the power demand of the dynamic electrical power load.

9. The method of claim 1, wherein discharging the one or more of the rechargeable energy storage components to supply power to the dynamic electrical power load further comprises:
discharging a first of the rechargeable energy storage components to supply power for the dynamic electrical power load until a remaining capacity within the first rechargeable energy storage component reaches a reserve level set for the first rechargeable energy storage component; and
when the remaining capacity within the first rechargeable energy storage component reaches the reserve level set for the first rechargeable energy storage component, discharging a second of the rechargeable energy storage components to supply power for the dynamic electrical power load.

10. The method of claim 9, wherein discharging the one or more of the rechargeable energy storage components to supply power to the dynamic electrical power load further comprises:
when the remaining capacities within all of the rechargeable energy storage components reach a respective reserve level set for each of the rechargeable energy storage components, discharging all of the rechargeable energy storage components at respective rates based on respective reserve levels to supply power for the dynamic electrical power load.

11. The method of claim 9, further comprising:
when regenerative energy restores the remaining capacity within the first rechargeable energy storage component to more than the reserve level set for the first rechargeable energy storage component:
ceasing the discharging of the second rechargeable energy storage component; and
discharging the first rechargeable energy storage component to supply power for the dynamic electrical power load.

12. The method of claim 1, wherein the one or more rechargeable energy storage components are distinct from each other with respect to one or more of chemical characteristics, storage mechanism, active materials, or electrode structures.

13. The method of claim 1, wherein the one or more rechargeable energy storage components are at least partially distinct from each other with respect to one or more of capacity, energy delivery rate, energy density, specific energy, and cycle characteristics.

14. A heterogeneous electrical energy storage system, comprising:
one or more rechargeable energy storage components, wherein each of the rechargeable energy storage components has a respective capacity, energy delivery rate, energy density, specific energy, and cycle characteristic;
a processor configured to:
measure a respective remaining capacity for at least some of the rechargeable energy storage components,
determine one or more respective rate limits currently applied to the rechargeable energy storage components,
determine a power demand of a dynamic electrical power load, and
in response to determining the power demand of the dynamic electrical power load, discharge one or more of the rechargeable energy storage components to supply power to the dynamic electrical power load in accordance with at least one of:
the respective remaining capacity for at least some of the rechargeable energy storage components, and
the one or more respective rate limits currently applied to the rechargeable energy storage components.

15. The heterogeneous electrical energy storage system of claim 14, wherein the processor is configured to discharge the one or more of the rechargeable energy storage components in accordance with at least the respective remaining capacity, the discharge comprising discharging the one or more rechargeable energy storage components in an order based on the respective remaining capacity measured for at least some of the rechargeable energy storage components.

16. The heterogeneous electrical energy storage system of claim 15, wherein the processor configured to discharge the one or more of the rechargeable energy storage components is further configured to:
determine a remaining capacity for a first of the rechargeable energy storage components;
if the remaining capacity for the first rechargeable energy storage component is at or above a threshold set for the first rechargeable energy storage component, discharge at least the first rechargeable energy storage component to supply power to the dynamic electrical power load; and
if the remaining capacity for the first rechargeable energy storage component is below the threshold set for the first rechargeable energy storage component, discharge at least a second of the rechargeable energy storage components, but not the first rechargeable energy storage component, to supply power to the dynamic electrical power load.

17. The heterogeneous electrical energy storage system of claim 16, wherein the processor configured to discharge the one or more of the rechargeable energy storage components in an order based on the respective remaining capacity is further configured to:
- determine a remaining capacity for the second of the rechargeable energy storage components;
- if the remaining capacity for the second rechargeable energy storage component is at or above a threshold set for the second rechargeable energy storage component, discharge at least the second rechargeable energy storage component to supply power to the dynamic electrical power load; and
- if the remaining capacity for the second rechargeable energy storage component is below the threshold set for the second rechargeable energy storage component, discharge at least a third one of the rechargeable energy storage components, but not the second rechargeable energy storage component, to supply power to the dynamic electrical power load.

18. The heterogeneous electrical energy storage system of claim 14, wherein the processor is configured to discharge the one or more of the rechargeable energy storage components in accordance with at least the power demand of the dynamic electrical power load relative to the one or more respective rate limits, and each of the one or more respective rate limits is based on at least one of: a charge state of a respective one of the rechargeable energy storage components, a state of health of the respective one of the rechargeable energy storage components, past usage of the respective one of the rechargeable energy storage components, expected future usage of the respective one of the rechargeable energy storage components, and temperature of the respective one of the rechargeable energy storage components.

19. A non-transitory computer readable medium embodying a computer program, the computer program comprising computer readable program code that when executed causes at least one processing device to:
- determine a power demand of a dynamic electrical power load in a system having one or more rechargeable energy storage components, each of the rechargeable energy storage components having a respective capacity, energy delivery rate, energy density, specific energy, and cycle characteristic;
- in response to determining the power demand of the dynamic electrical power load, discharge one or more of the rechargeable energy storage components to supply power to the dynamic electrical power load in accordance with at least one of:
  - a respective remaining capacity measured for at least some of the rechargeable energy storage components, and
  - the power demand of the dynamic electrical power load relative to one or more respective rate limits currently applied to the rechargeable energy storage components.

20. The non-transitory computer readable medium of claim 19, wherein the computer readable program code that when executed causes at least one processing device to discharge one or more of the rechargeable energy storage components to supply power to the dynamic electrical power load further comprises code that when executed causes at least one processing device to discharge the one or more rechargeable energy storage components in an order based on at least one of the respective capacities, energy delivery rates, energy densities, and cycle characteristics of the rechargeable energy storage components.

* * * * *